United States Patent
Fang et al.

(10) Patent No.: US 8,117,018 B2
(45) Date of Patent: Feb. 14, 2012

(54) DETERMINING STRUCTURAL DIP AND AZIMUTH FROM LWD RESISTIVITY MEASUREMENTS IN ANISOTROPIC FORMATIONS

(75) Inventors: Sheng Fang, Houston, TX (US); Gulamabbas Merchant, Houston, TX (US); Eric Hart, Galveston, TX (US); Andrew D. Kirkwood, Houston, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 445 days.

(21) Appl. No.: 12/356,430

(22) Filed: Jan. 20, 2009

(65) Prior Publication Data
US 2009/0192713 A1    Jul. 30, 2009

Related U.S. Application Data

(60) Provisional application No. 61/023,517, filed on Jan. 25, 2008.

(51) Int. Cl.
*G01V 3/38* (2006.01)
*G01V 1/48* (2006.01)

(52) U.S. Cl. .............................. 703/7; 324/339; 702/11

(58) Field of Classification Search .................. 702/2, 6, 702/7, 9, 10, 11, 33, 127, 189; 73/800; 175/45; 324/337, 338, 339, 343
See application file for complete search history.

(56) References Cited

U.S. PATENT DOCUMENTS

| | | | |
|---|---|---|---|
| RE35,386 E | 12/1996 | Wu et al. | |
| 6,092,024 A | 7/2000 | Wu | |
| 6,393,364 B1 * | 5/2002 | Gao et al. ........................ | 702/7 |
| 6,686,736 B2 | 2/2004 | Schoen et al. | |
| 7,274,991 B2 * | 9/2007 | Tabarovsky et al. .............. | 702/7 |
| 7,471,088 B2 | 12/2008 | Yu et al. | |
| 7,483,793 B2 | 1/2009 | Wang et al. | |

OTHER PUBLICATIONS

T. Wang et al., "Formation Dip, Azimuth and Anisotropy in More Complex Depositional Environments," SPWLA 47th Annual Logging Symposium, Jun. 4-7, 2006, pp. 1-15.

* cited by examiner

*Primary Examiner* — John H Le
(74) *Attorney, Agent, or Firm* — Mossman Kumar & Tyler PC

(57) ABSTRACT

Cross-component measurements in combination with standard propagation resistivity measurements are processed to estimate the vertical and horizontal resistivities, relative dip and relative azimuth of an anisotropic earth formation.

18 Claims, 17 Drawing Sheets

DETERMINING STRUCTURAL DIP AND AZIMUTH FROM LWD RESISTIVITY MEASUREMENTS IN ANISOTROPIC FORMATIONS

CROSS-REFERENCES TO RELATED APPLICATIONS

This application claims priority from U.S. Provisional Patent Application Ser. No. 61/023,517 filed on Jan. 25, 2008.

BACKGROUND OF THE DISCLOSURE

1. Field of the Disclosure

This disclosure relates generally to drilling of wells into earth formations, and more particularly to the determination of formation properties in situations where the earth formations are anisotropic.

2. Description of the Related Art

To obtain hydrocarbons such as oil and gas, boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

In order to maximize the amount of recovered oil, boreholes are commonly drilled in a substantially horizontal orientation in close proximity to the oil water contact, but still within the oil zone. U.S. Pat. No. RE35386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity sensor typically comprises a transmitter and a plurality of sensors. Measurements may be made with propagation sensors that operate in the 400 kHz and higher frequency.

The hardware used by Wu is a multiple propagation resistivity (MPR) device, schematically illustrated by the example in FIG. 2A. An exemplary tool may include an electronics module 200, two receiver coils 213 and 215, and two pairs of transmitter coils 209, 211 and 217, 219. Such a device has axially oriented coils and has no azimuthal sensitivity. U.S. Pat. No. 6,092,024 to Wu, having the same assignee as the present disclosure, showed that by making redundant measurements with such a device, it was possible to determine the properties of anisotropic media without ambiguity by using complicated processing.

U.S. patent application Ser. No. 11/298,255 of Yu et al., having the same assignee as the present disclosure, teaches the use of a resistivity logging tool having azimuthal sensitivity and illustrated in FIG. 2B. The tool comprises two transmitter coils 251, 251' whose dipole moments are parallel to the tool axis direction and two receiver coils 253, 253' that have dipole moments perpendicular to the transmitter direction. In one embodiment of the disclosure, the tool operates at 400 kHz frequency. When the first transmitter is activated, the two receivers measure the magnetic field produced by the induced current in the formation. This is repeated for, the second transmitter. The signals are combined in following way:

$$H_{T1} = H_2 - (d_1/(d_1+d_2))^3 \cdot H_1$$

$$H_{T2} = H_1 - (d_1/(d_1+d_2))^3 \cdot H_2 \quad (1).$$

Here, $H_1$ and $H_2$ are the measurements from the first and second receivers, respectively, and the distances $d_1$ and $d_2$ are as indicated in FIG. 2B. The tool rotates with the BHA and in an exemplary mode of operation, makes measurements at 16 angular orientations 22.5° apart. The measurement point is at the center of two receivers. In a uniform, isotropic formation, no signal would be detected at either of the two receivers. The device thus makes use of cross component measurements, called principal cross-components, obtained from a pair of transmitters disposed on either side of at least one receiver. It should further be noted that using well known rotation of coordinates, the method of the present disclosure also works with various combinations of measurements as long as they (i) correspond to signals generated from opposite sides of a receiver, and, (ii) can be rotated to give the principal cross components. This device and its variants are referred to as an azimuthal propagation resistivity (APR) tool.

U.S. patent application Ser. No. 11/489,875 of Wang et al., having the same assignee as the present disclosure, disclose a tool which has the conventional propagation resistivity tool together with the azimuthal propagation resistivity tool of Yu. With such a combination, it is possible to obtain a pseudo-image of the earth formation. Additionally, it should be noted that the emphasis in Yu and in Wang is on reservoir navigation and determining a distance to an interface in the earth formation and little effort is spent on the determination of the anisotropic resistivity properties of the earth formation. The present disclosure addresses this need.

SUMMARY OF THE DISCLOSURE

One embodiment of the disclosure is a method of evaluating an anisotropic earth formation. The method includes: making azimuthally sensitive measurements indicative of a resistivity property of an earth formation using a rotating downhole assembly in a borehole; making additional measurements indicative of the resistivity property of the earth formation using a transmitter antenna on the downhole assembly having an axis substantially parallel to a longitudinal axis of the downhole assembly and a receiver antenna on the downhole assembly having an axis substantially parallel to the longitudinal axis of the downhole assembly; and using the azimuthally sensitive measurements and the additional measurements to estimate a value of at least one property from the group: (i) a horizontal resistivity of the earth formation, (ii) a vertical resistivity of the earth formation, (iii) a dip angle of a formation anisotropy axis, and (iv) an azimuth angle of the formation anisotropy axis.

Another embodiment of the disclosure is an apparatus configured to evaluate an anisotropic earth formation. The apparatus includes: a sensor arrangement configured provide azimuthally sensitive measurements indicative of a resistivity property of an earth formation using a rotating downhole assembly in a borehole; a transmitter antenna on the downhole assembly having an axis substantially parallel to a longitudinal axis of the downhole assembly; a receiver antenna on the downhole assembly having an axis substantially parallel to the longitudinal axis of the downhole assembly, the receiver antenna configured to provide additional measurements indicative of the resistivity property of the earth formation upon activation of the transmitter antenna; and a processor configured using the azimuthally sensitive measurements and the additional measurements to estimate a value of at least one property from the group: (i) a horizontal resistivity of the earth formation, (ii) a vertical resistivity of the earth formation, (iii) a dip angle of a formation anisotropy axis, and (iv) an azimuth angle of the formation anisotropy axis.

Another embodiment of the disclosure is computer-readable medium accessible to a processor. The computer-readable medium includes instructions which enable the processor to use: azimuthally sensitive measurements indicative of a resistivity property of an earth using a rotating downhole assembly in a borehole; and additional, azimuthally insensitive measurements indicative of the resistivity property of the earth formation to estimate a value of at least one property from the group: (i) a horizontal resistivity of the earth formation, (ii) a vertical resistivity of the earth formation, (iii) a dip angle of a formation anisotropy axis, and (iv) an azimuth angle of the formation anisotropy axis.

BRIEF DESCRIPTION OF THE DRAWINGS

For detailed understanding of the present disclosure, reference should be made to the following detailed description of exemplary embodiment(s), taken in conjunction with the accompanying drawings, in which like elements have been given like numerals, wherein.

DETAILED DESCRIPTION OF THE DISCLOSURE

Figure 1:
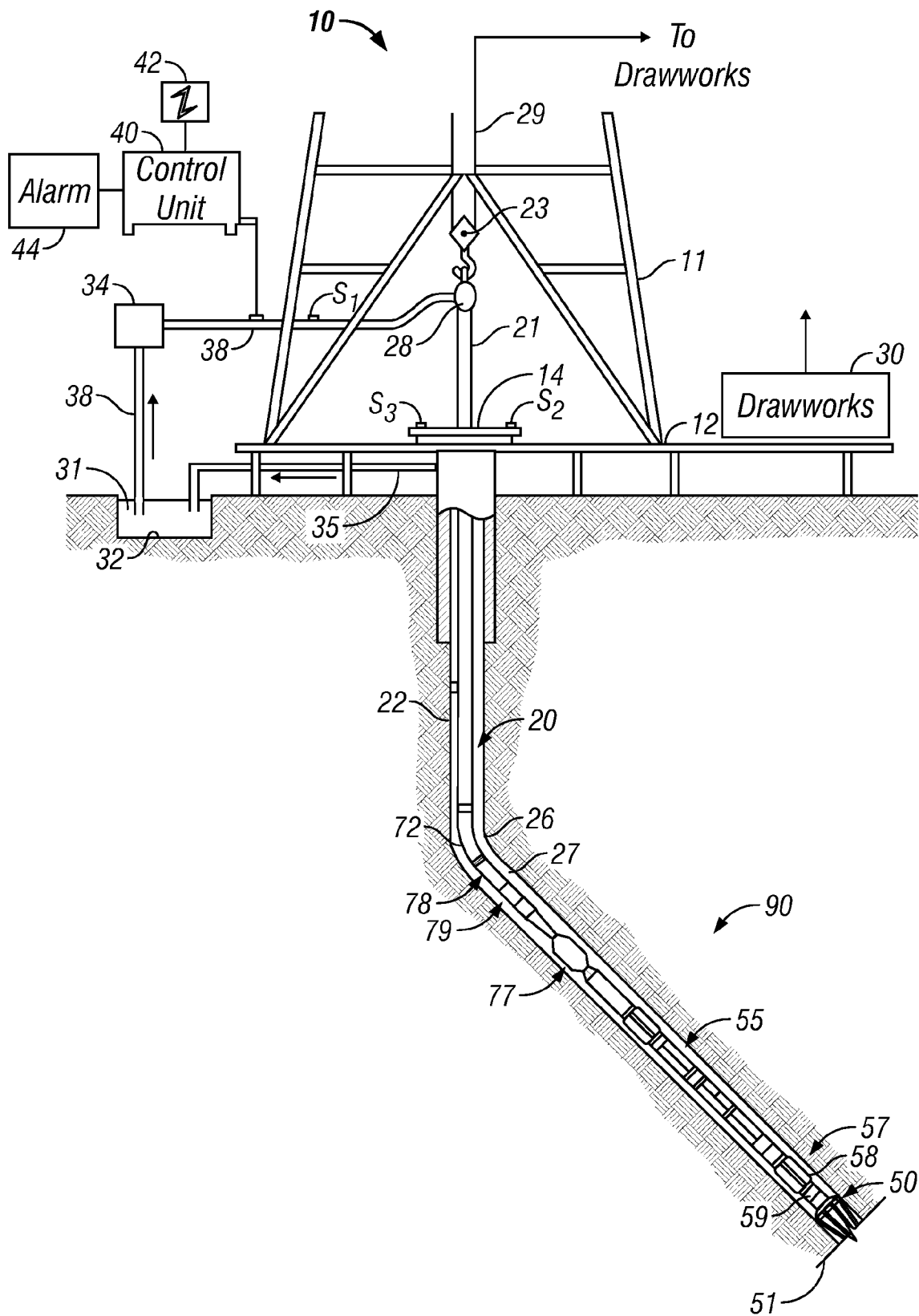
FIG. 1 shows a schematic diagram of a drilling system having a drill string that includes a sensor system according to the present disclosure.
Figure 2A:
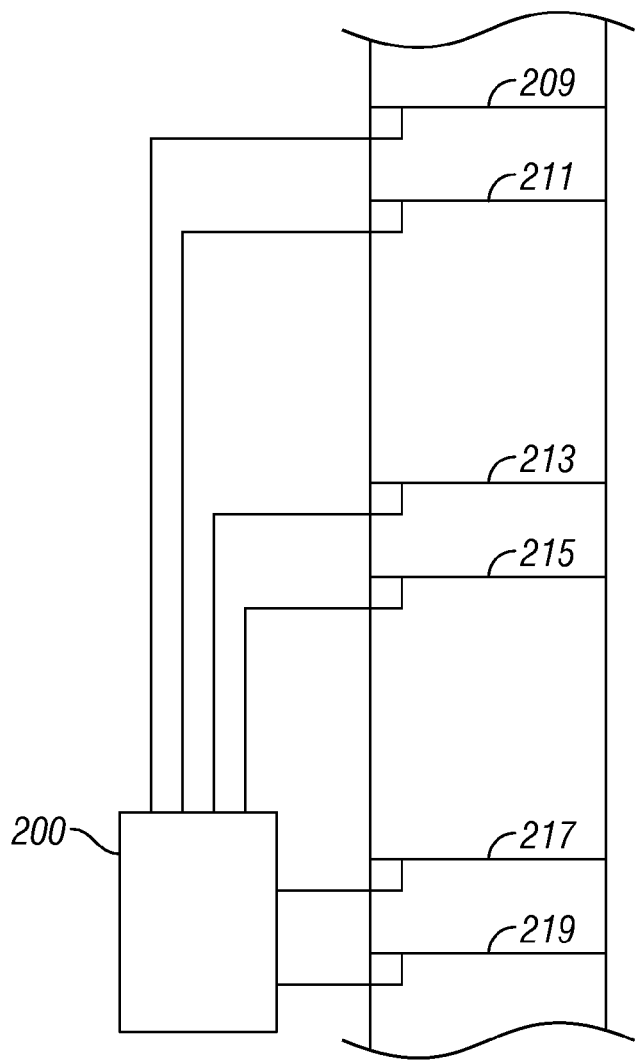
FIGS. 2A and 2B (prior art) illustrate a prior art multiple propagation resistivity tool and an azimuthal propagation resistivity tool.
Figure 2B:
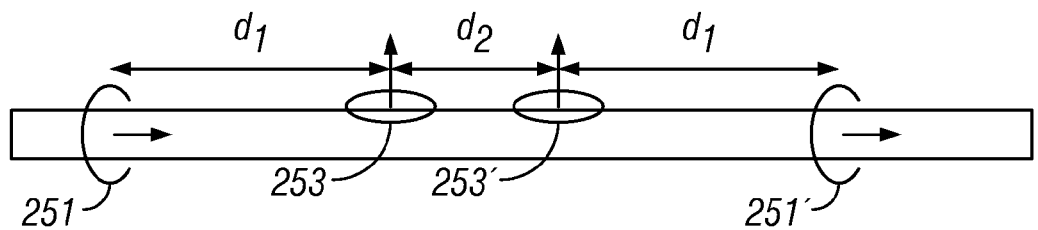

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Before proceeding further with disclosure, we first review the standard propagation resistivity response in an anisotropic formation. For a coaxial array, the magnetic field response is given by $$H_{zz} = \frac{M}{4\pi L^3}[2(1 - ik_h L)e^{ik_h L} + ik_h L(e^{ik_h L} - e^{ik_h L \beta})] \quad (2)$$

where
M is the source moment,
L is the coil spacing between the receiver and transmitter antennas,
$k_h = \sqrt{i\omega\mu\sigma_h}$, $$\beta = \sqrt{1 + \left(\frac{R_h}{R_v} - 1\right)\sin^2\theta}, \quad (3)$$

θ is the apparent dip angle.
It is clear that $H_{zz}$ depends on both Rh and β but not explicitly on θ. In fact, different combinations of anisotropy ratio ($R_h/R_v$) and θ can give the same value of β. This has been discussed in Wu '024. Hence, ambiguity exists in determining anisotropy ratio and θ from the standard propagation resistivity measurement. Wu '024 addressed this ambiguity by using redundant measurements. In the present disclosure, this ambiguity is resolved by using APR measurements.

The cross-coil response is given by $$H_{zx} = \frac{M}{4\pi L^3}\left[\frac{\cos\theta}{\sin\theta} ik_h L(e^{ik_h L} - e^{ik_h L \beta})\right] \quad (4)$$

Like the coaxial array, the cross-component response depends on both $R_h$ and β. However, the cross-component also has explicit dependence on the apparent dip angle θ. Eqn. (4) shows that the APR response is different from zero only if the formation is anisotropic. If the formation is isotropic, the APR response is always zero. In fact, the coaxial response and cross-component response are related through the relation $$H_{zz} = \frac{M}{4\pi L^3}[2(1 - ik_h L)e^{ik_h L}] + \frac{\sin\theta}{\cos\theta}H_{zx} \quad (5)$$

Hence, we can predict the coaxial response from the cross-component response, $R_h$, and θ even without knowing the anisotropy ratio. Equivalently, we can calculate $R_h$ and θ from both coaxial and cross-component measurements. Unfortunately, this is not straightforward of because the APR tool has different coil spacings from the standard propagation resistivity tool.

Figure 3:
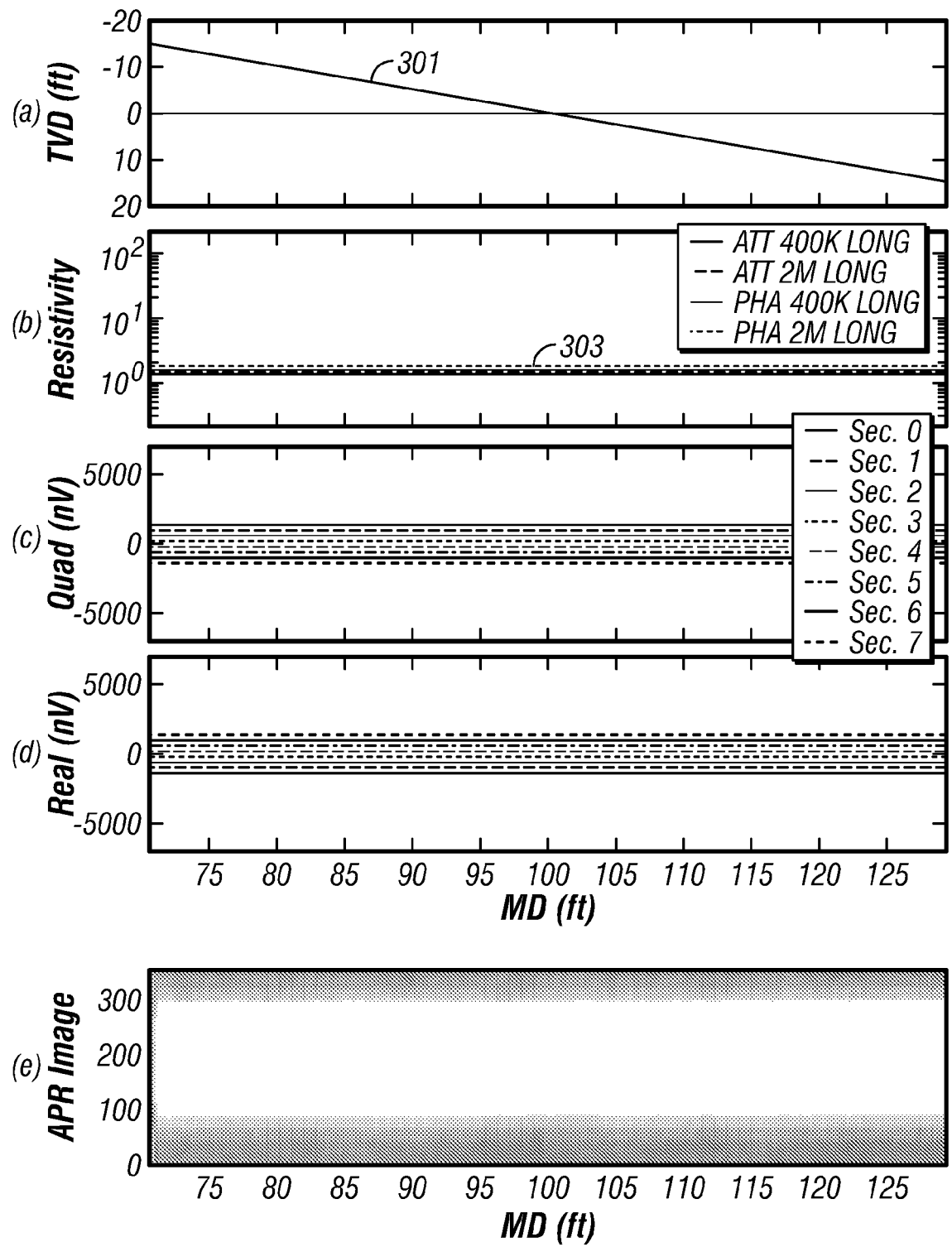
FIG. 3 illustrates (a) a borehole in an anisotropic medium with $R_h$=1 Ω-m and $R_v$=3 Ω-m with a 60° angle between the borehole axis and the anisotropy symmetry axis, (b) resistivity measurements made by an MPR, (c) and (d) the quadrature and in-phase signals of the APR, and (e) an image produced by using the MPR and APR.

Next, we illustrate how the APR response varies with Rh, $R_v$, and θ. FIG. 3 shows the APR response and associated resistivity images for an anisotropic formation. The horizontal and vertical resistivities are 1 Ω-m and 3 Ω-m respectively.

The symmetry axis is vertical and the apparent dip between the symmetry axis and the borehole 301 is 60°. The MPR response derived from attenuation and phase measurements at 400 kHz and 2 MHz 303 for the long spacing are very similar. FIG. 3(c) shows a plot of the quadrature component of the transverse detector signal for 8 different sectors of 45°. FIG. 3(d) shows a plot of the in-phase component of the transverse detector signal for 8 different sectors of 45°. This separation by sectors clearly shows the effects of anisotropy. Reference is made to Wang, the contents of which are incorporated herein by reference, for further details. FIG. 3(e) shows a pseudo-image obtained by combining the MPR and APR measurements. This is also discussed in Wang.

Figure 4:
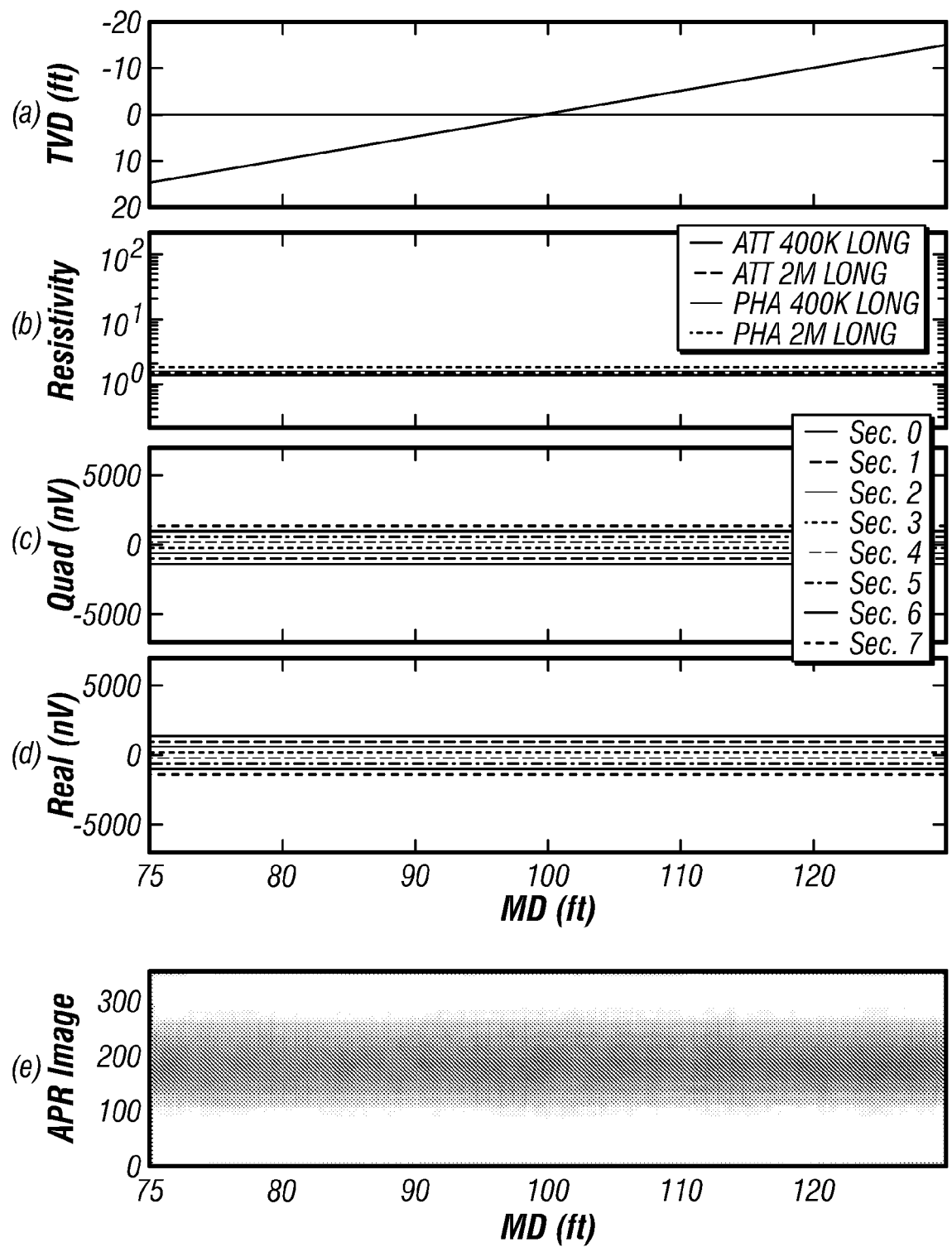
FIG. 4 is similar to FIG. 3 but with an angle of 120° between the borehole axis and the anisotropy symmetry axis.

In FIG. 4 the apparent dip is 120°. For a 60° dip, the APR image shows a conductive bed above the wellbore, whereas for a 120° dip, the conductive bed appears below the wellbore. The standard propagation resistivity responses have identical curve separation. In both cases, the 400 kHz attenuation curve reads about 1.78 Ω-m and the 2 MHz phase difference curve reads about 2.97 Ω-m. The APR signal strength is 845 nV.

Figure 5:
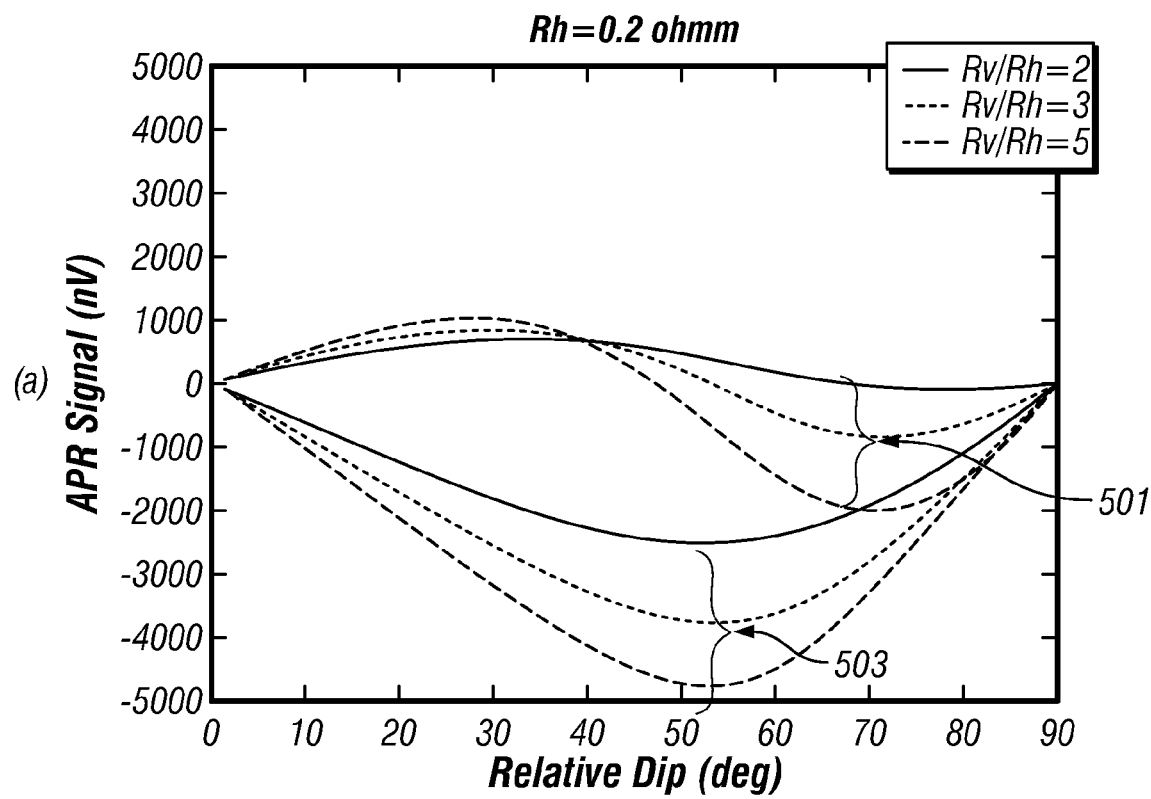
FIG. 5 shows (a) the in-phase and quadrature signals, and (b) amplitude APR responses to an anisotropic formation with $R_h$=0.2 Ω-m as a function of apparent dip angle for different anisotropy ratios.
Figure 5:
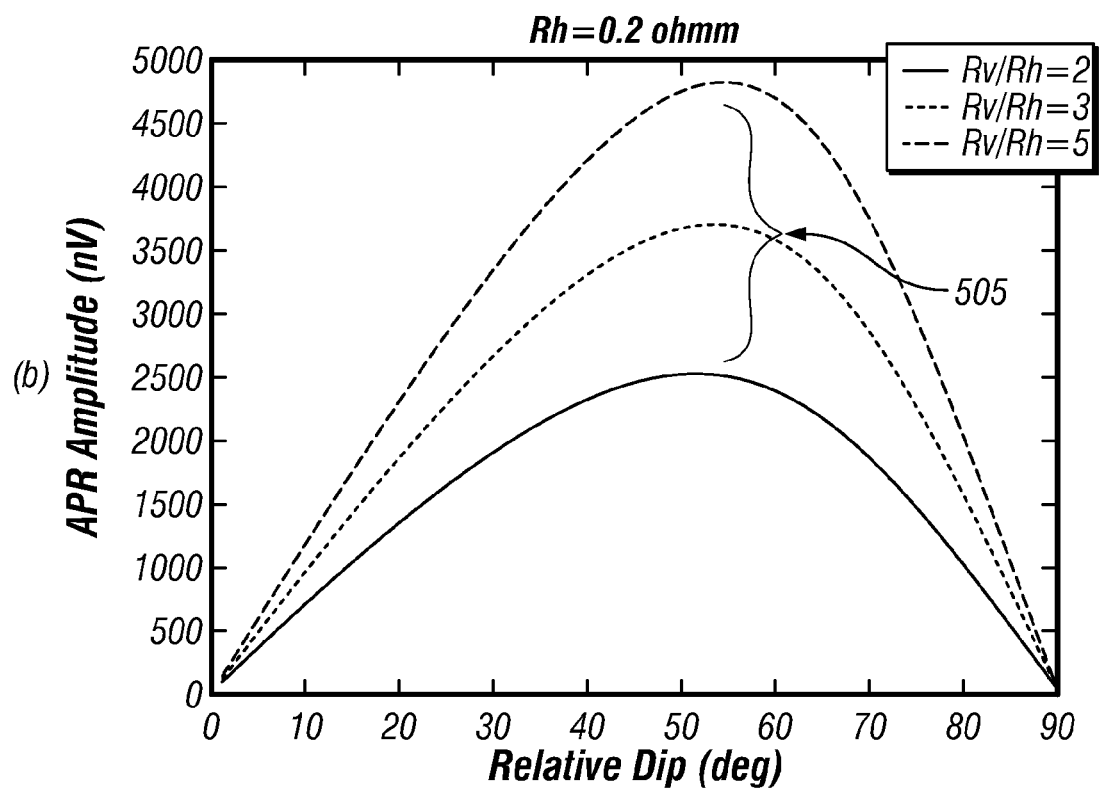

FIG. 5 shows the APR response to an anisotropic formation as a function of relative dip angle and vertical resistivity. The horizontal resistivity remains at 0.2 Ω-m. The in-phase 501 and quadrature components 503 have different behavior. The quadrature component is skew-symmetric. Two different dip angles can yield identical quadrature response. For instance, at both 20° and 78° dip angles, the response is −2000 nV. However, the in-phase component has 1600 nV and −0 nV readings at the two dip angles. This example shows that it is not possible to uniquely determine the dip angle with only the quadrature component. Rather, both components must be combined to remove the ambiguity.

FIG. 5 also shows that at both low (<40°) apparent angles and high (>65°) apparent angles, the quadrature response is nearly a linear function of the apparent dip. This linear proportionality makes the quadrature component highly sensitive to apparent dip angle. In the middle dip range, the quadrature component has reduced sensitivity to the apparent dip angle. However, the in-phase component shows a linear sensitivity in the same range. This again indicates that the in-phase and quadrature components combined will have strong sensitivity to the apparent dip angle.

For near 0° dips, the APR response approaches zero or drop below the noise floor. See amplitude curves 505. Hence, it is not possible to determine the dip or resistivity anisotropy. For near 90° dips, the APR response also approaches zero. However, the standard propagation resistivity now will have the strongest response to anisotropy at these angles. Hence, combining the APR and standard propagation resistivity measurement will allow us to resolve resistivity anisotropy and associated dip and azimuth angles without ambiguity. FIG. 5 shows, to no surprise, that lower anisotropy ratio leads to weak APR responses.

Figure 6:
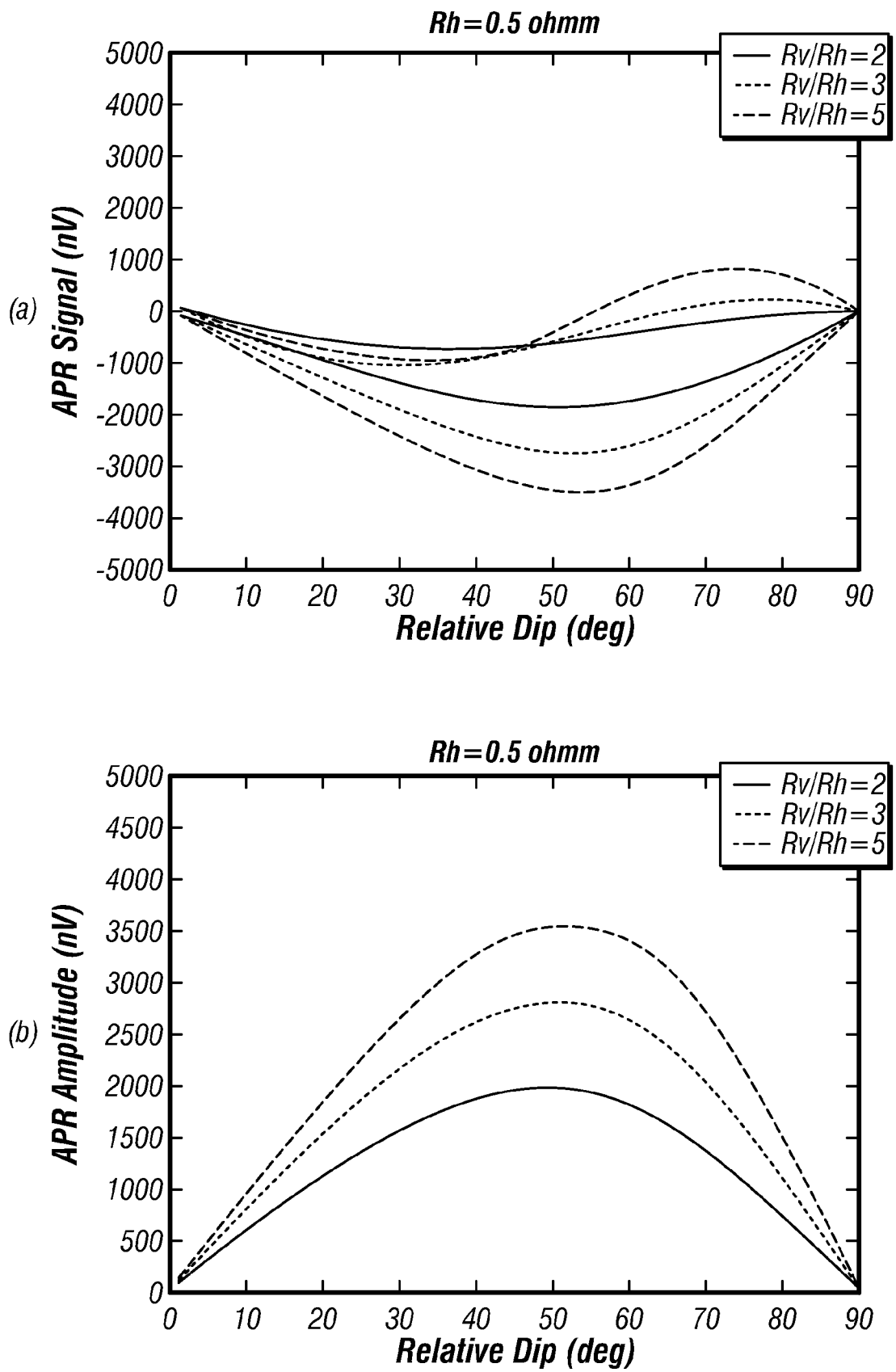
FIG. 6 is similar to FIG. 5 but with $R_h$=0.5 Ω-m.

The signature of the in-phase and quadrature components contains information about the magnitude of the dip angle. For instance, the low apparent angles, the quadrature part is negative and the in-phase part is positive. At high apparent dip angles, both parts can be negative. However, that both parts are negative may also indicate a low apparent dip angle. FIG. 6 shows that for a higher $R_h$ of 0.5 Ω-m, both the in-phase and quadrature components are negative at low apparent dip angles. Hence, qualitatively speaking, large uncertainty will result in the dip determination when both components are negative. However, because the standard propagation resistivity measurement has different response at low and high apparent dip angles, combination with the standard propagation resistivity measurement will help reduce the uncertainty.

Figure 7:
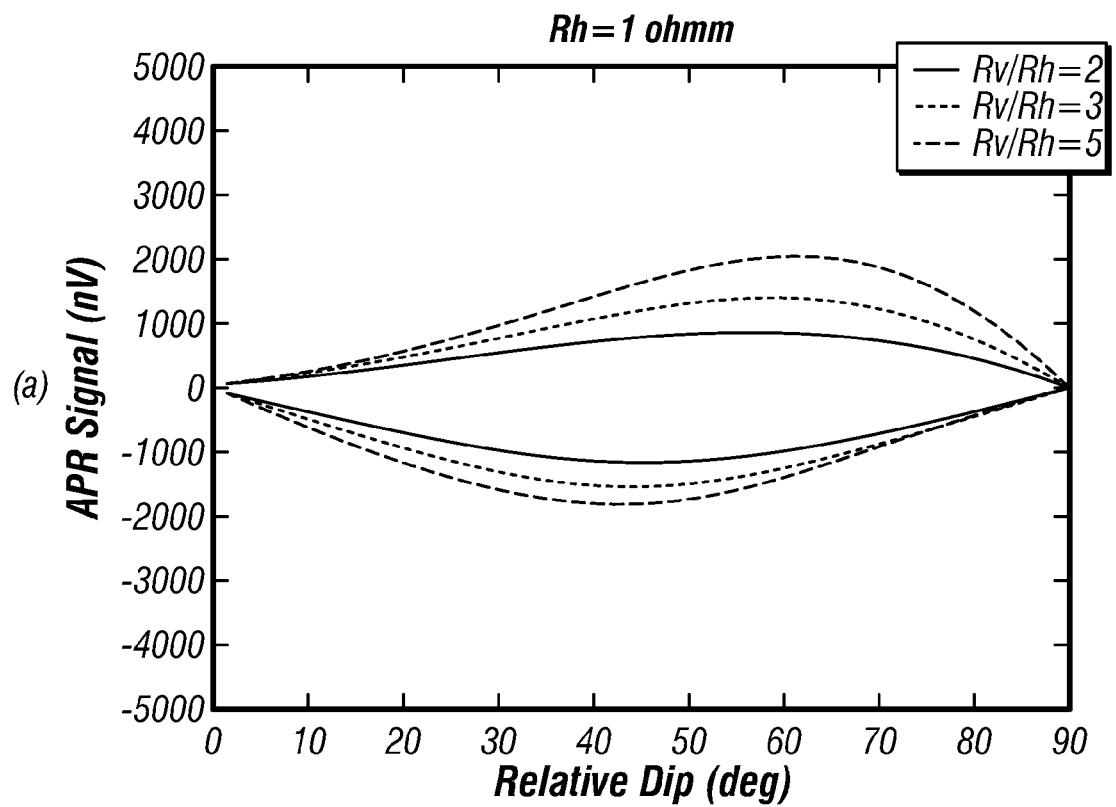
FIG. 7 is similar to FIG. 5 but with $R_h$=1.0 Ω-m.
Figure 7:
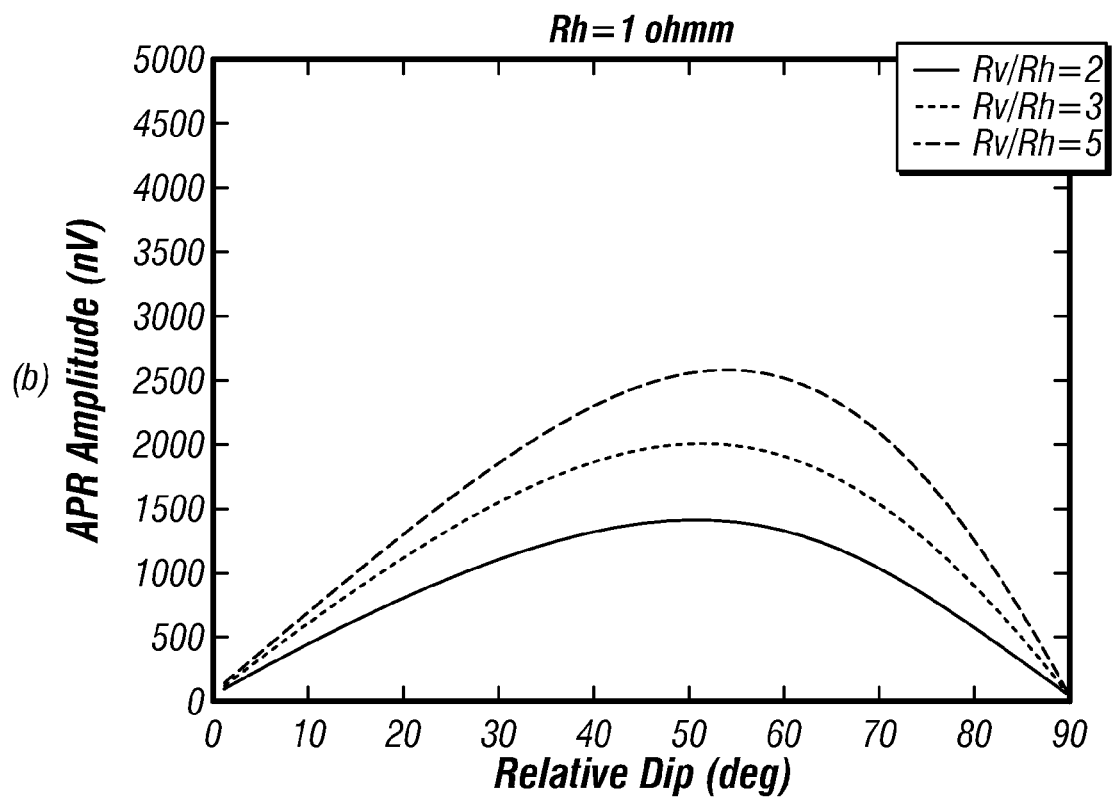
Figure 8:
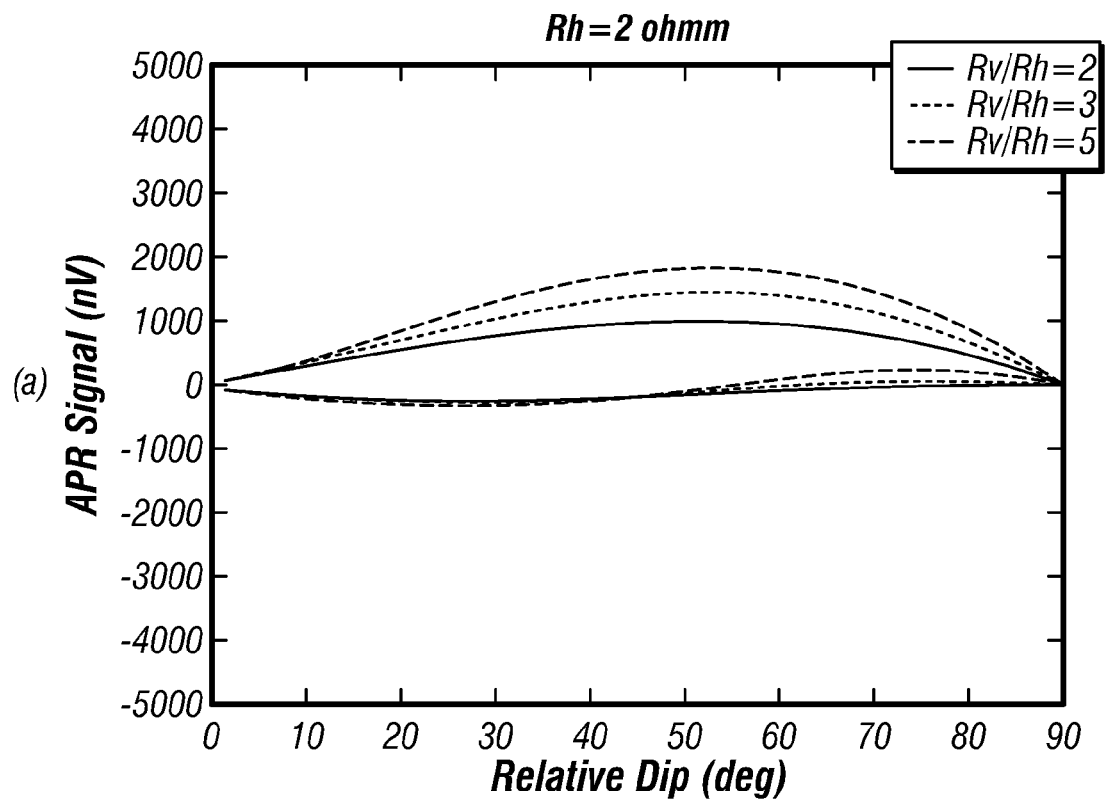
FIG. 8 is similar to FIG. 5 but with $R_h$=2.0 Ω-m.
Figure 8:
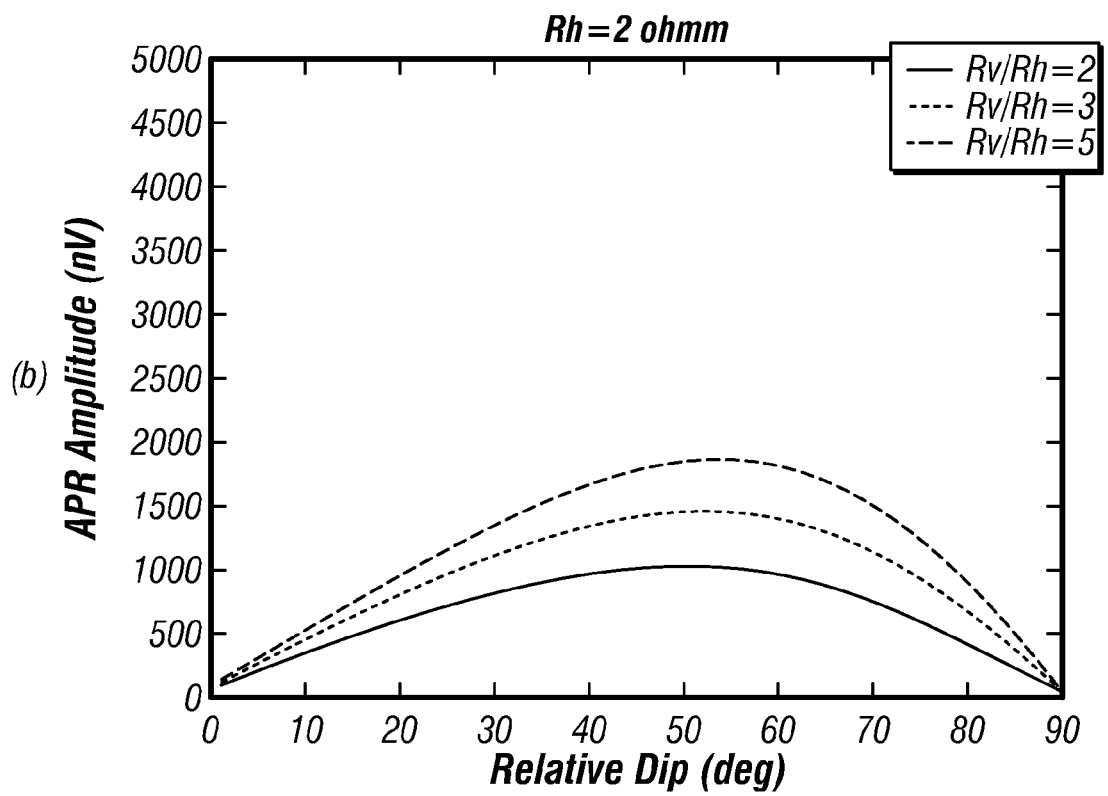
Figure 9:
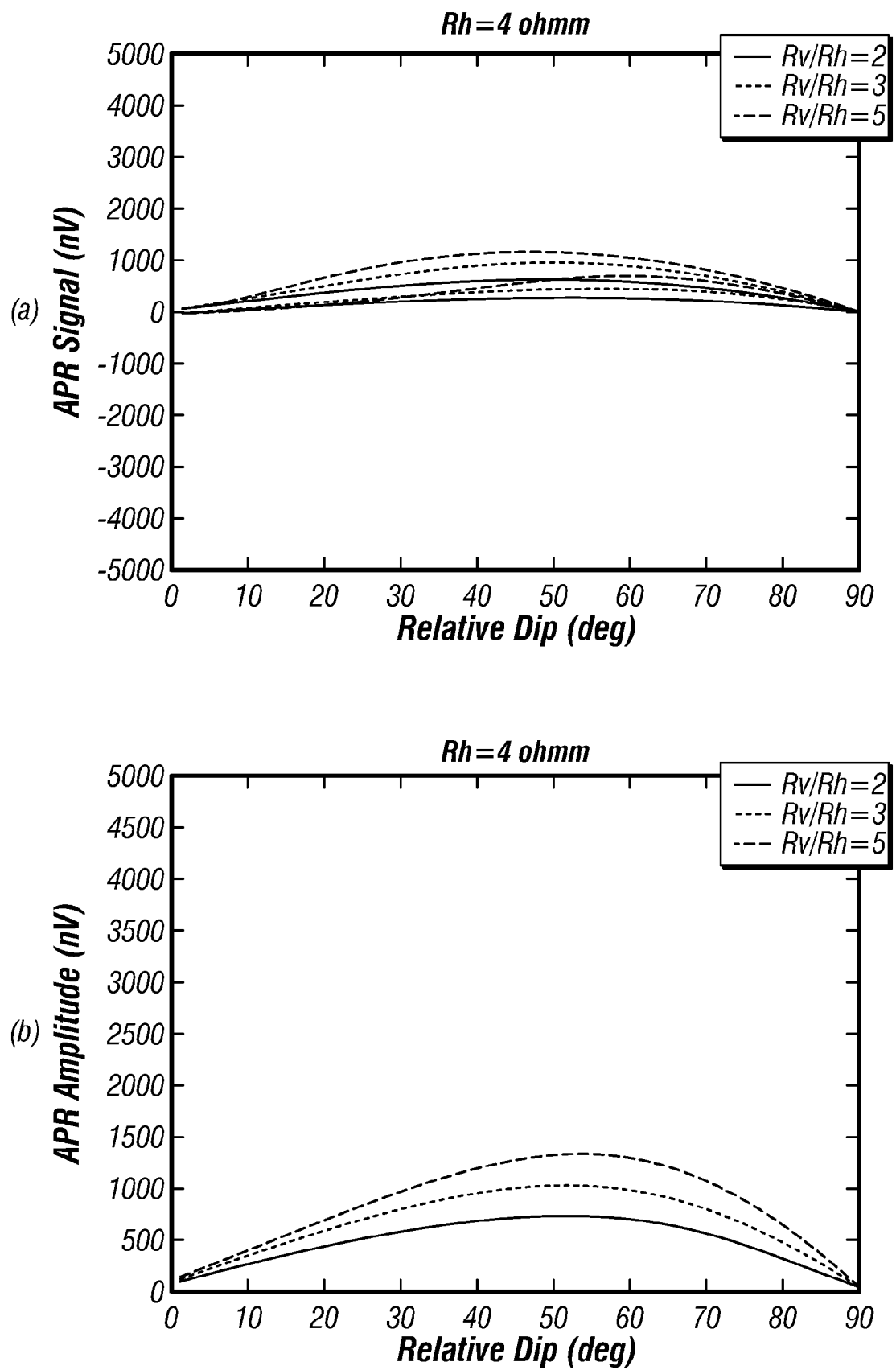
FIG. 9 is similar to FIG. 5 but with $R_h$=4.0 Ω-m.

As $R_h$ further increases to 1 Ω-m (FIG. 7), 2 Ω-m (FIG. 8), and 4 Ω-m (FIG. 9), the quadrature component becomes strictly positive. However, the in-phase component may still change its sign. The signal amplitude for the same anisotropy ratio drops roughly as $1/\sqrt{R_h}$. It is interesting to note that the maximum signal amplitude occurs around 53° dip angle, regardless of $R_h$ and anisotropy ratio.

In the present disclosure four unknowns, $R_h$, $R_v$, apparent dip, and apparent azimuth, are to be determined at each and every depth. This requires at least four independent measurements to uniquely calculate the unknowns. In addition to the in-phase and quadrature components of APR, we use two standard propagation resistivity measurements, 400 kHz attenuation and 2 MHz phase difference. The choice of the particular MPR measurements is not to be construed as a limitation and other measurements could be used. The apparent azimuth angle is readily estimated from 16 (or other number of) sectors of APR data. The remaining three unknowns, $R_h$, $R_v$, and apparent dip, are then calculated from the APR real and imaginary responses corresponding to the estimated apparent azimuth angle and the two propagation resistivity measurements. Hence, we use four measurements to determine three unknowns. The data redundancy helps reduce the calculation uncertainty and increase the calculation robustness.

Figure 10:
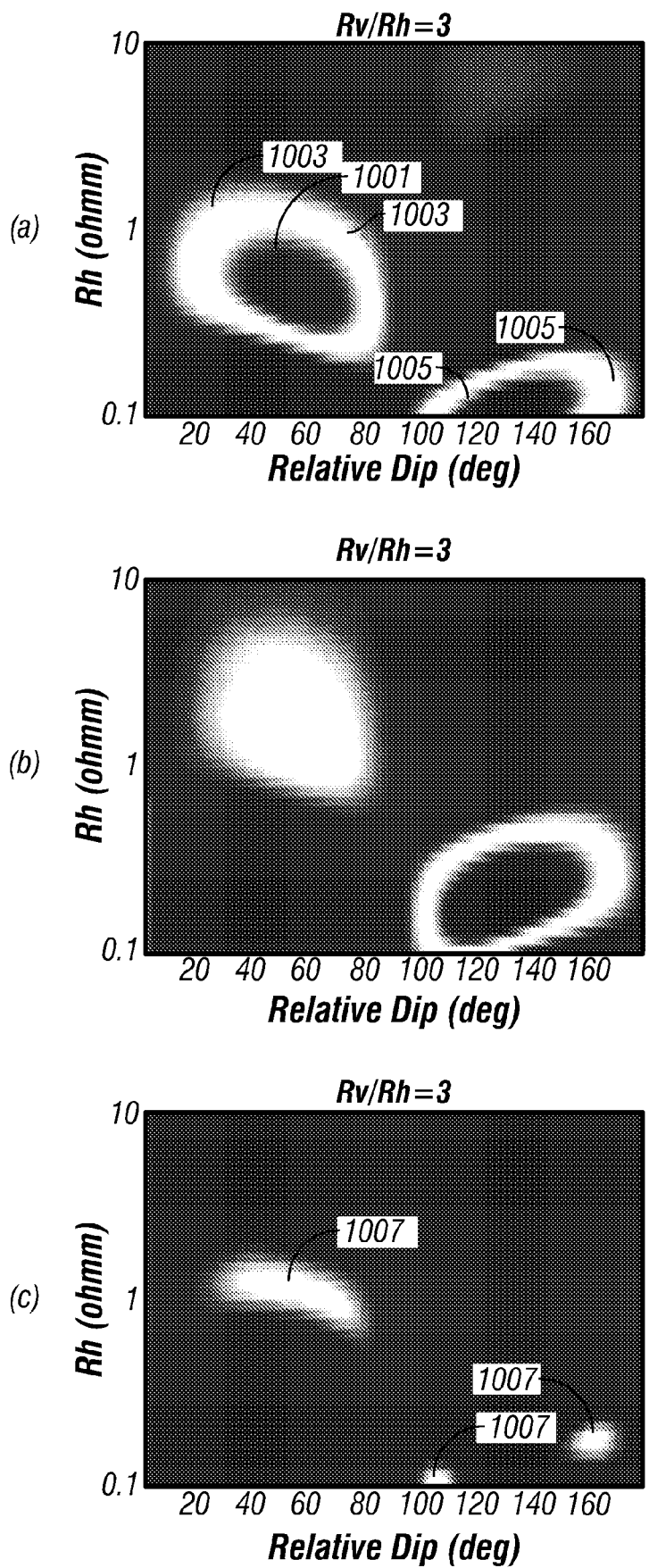
FIG. 10 shows results of inversion using (a) only the APR in-phase component, (b) only the APR quadrature component, and (c) the APR in-phase and quadrature components.

To understand the role of each measurement in determining the unknown parameters, we will display the uncertainty map using each and every of the measurements. FIG. 10 shows the uncertainty map in the calculation of $R_h$ (ordinate) and apparent dip (abscissa) using the APR in-phase component only (a), quadrature component only (b), and both components (c). The true $R_h$, $R_v$, and apparent dip are 1 Ω-m, 3 Ω-m, and 60°, respectively 1001. The calculation using the APR in-phase component only in (a) yields two solution regions, separated by the 90° apparent dip. The solution region 1005 has a lower $R_h$ value than the other solution region 1003. The calculation using the APR quadrature component only in (b) leads to similar solution regions except the one below the 90° apparent dip has higher $R_h$ values. Clearly, neither the in-phase component nor the quadrature component has a tight constraint on the true solution. Combination of the in-phase and quadrature components eliminates much of the solution ambiguity (c). The possible solutions are now limited to three isolated regions 1007. The $R_h$ and apparent dip variation within each region is much smaller than that with either of the component.

Figure 11:
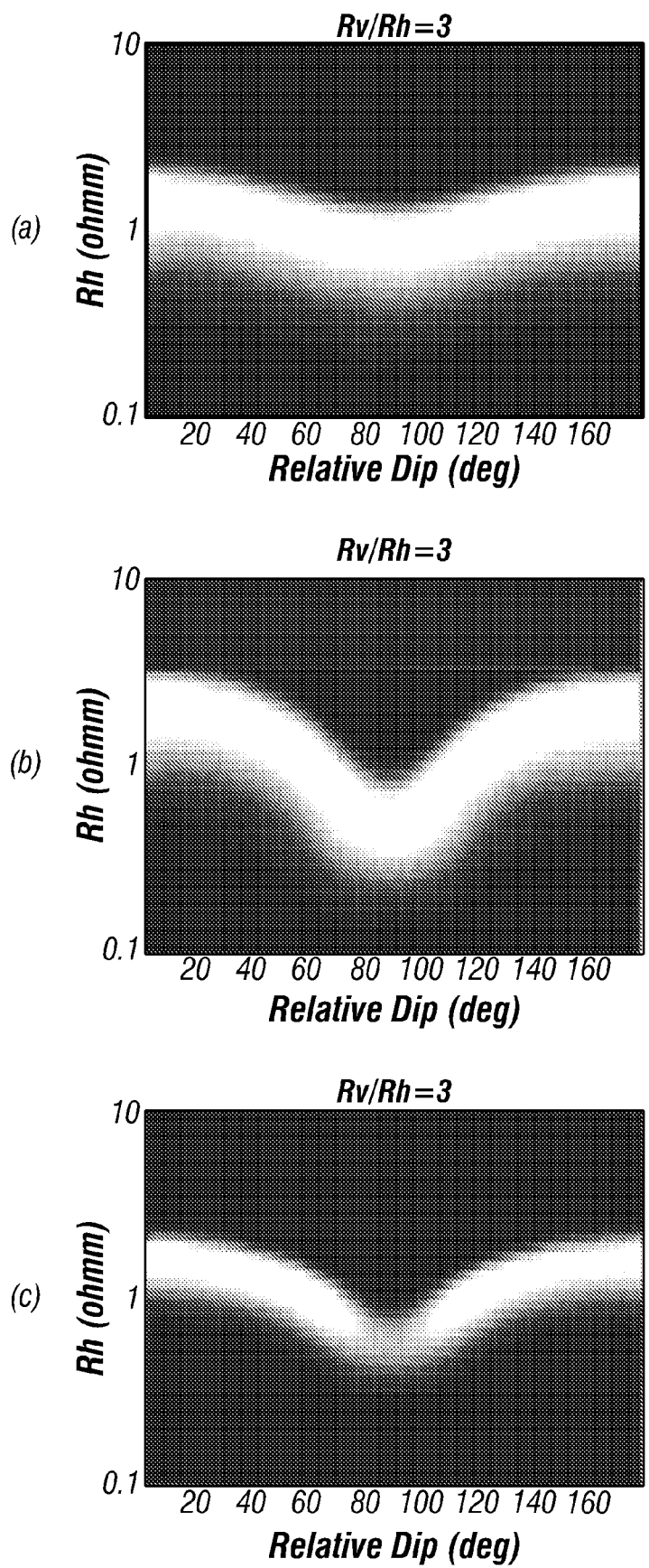
FIG. 11 shows the results of inverting (a) MPR 400 kHz amplitude, (b) MPR 2 MHz phase measurements, and (c) MPR 400 kHz amplitude and 2 MHz phase measurements.

Next, we illustrate the solution uncertainty with the standard propagation resistivity measurements. As FIG. 11 shows, both the 400 kHz attenuation (a) and 2 MHz phase-difference (b) responses have similar solution regions. It is clear that for either response, it is possible to find any apparent dip that fits the measurement equally or nearly equally well as long as the $R_h$ is changed correspondingly. Combination of the two measurements (c) slightly reduces the uncertainty in $R_h$ but may still give ambiguous solution in the apparent dip.

Figure 12:
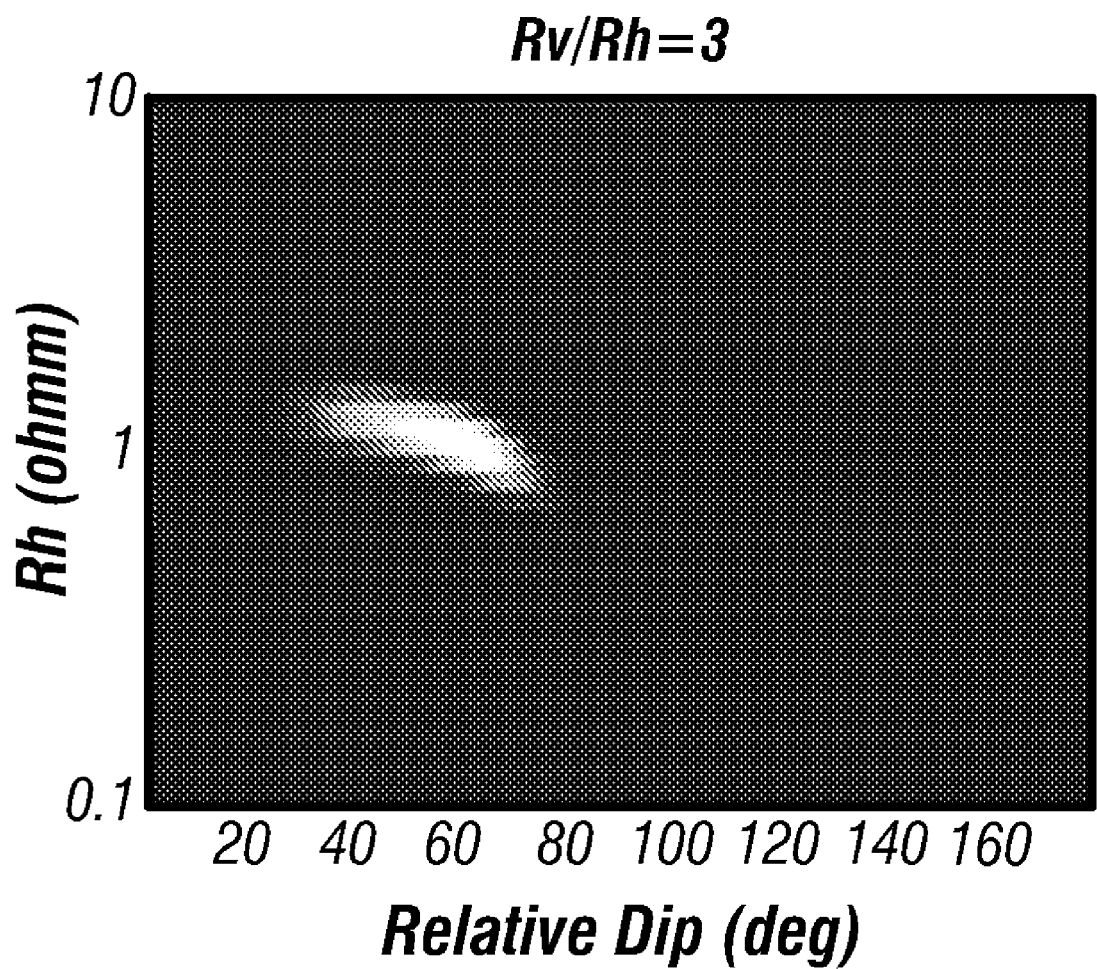
FIG. 12 shows results of inversion of the APR real and imaginary components combined with standard propagation 400 kHz attenuation and 2 MHz phase difference responses.

Comparing FIG. 11 to FIG. 10 suggests that the standard propagation resistivity measurements, although having poor constraints by themselves on the apparent dip, may tightly limit the uncertainty region for the apparent dip because the possible above 90° apparent dip solution region is unambiguously eliminated by the standard propagation resistivity measurements. This is confirmed by FIG. 12 that shows the calculation result using all the four measurements. The final result shows that $R_h$ is well constrained. Relatively high uncertainty may still be expected for the apparent dip.

Figure 13:
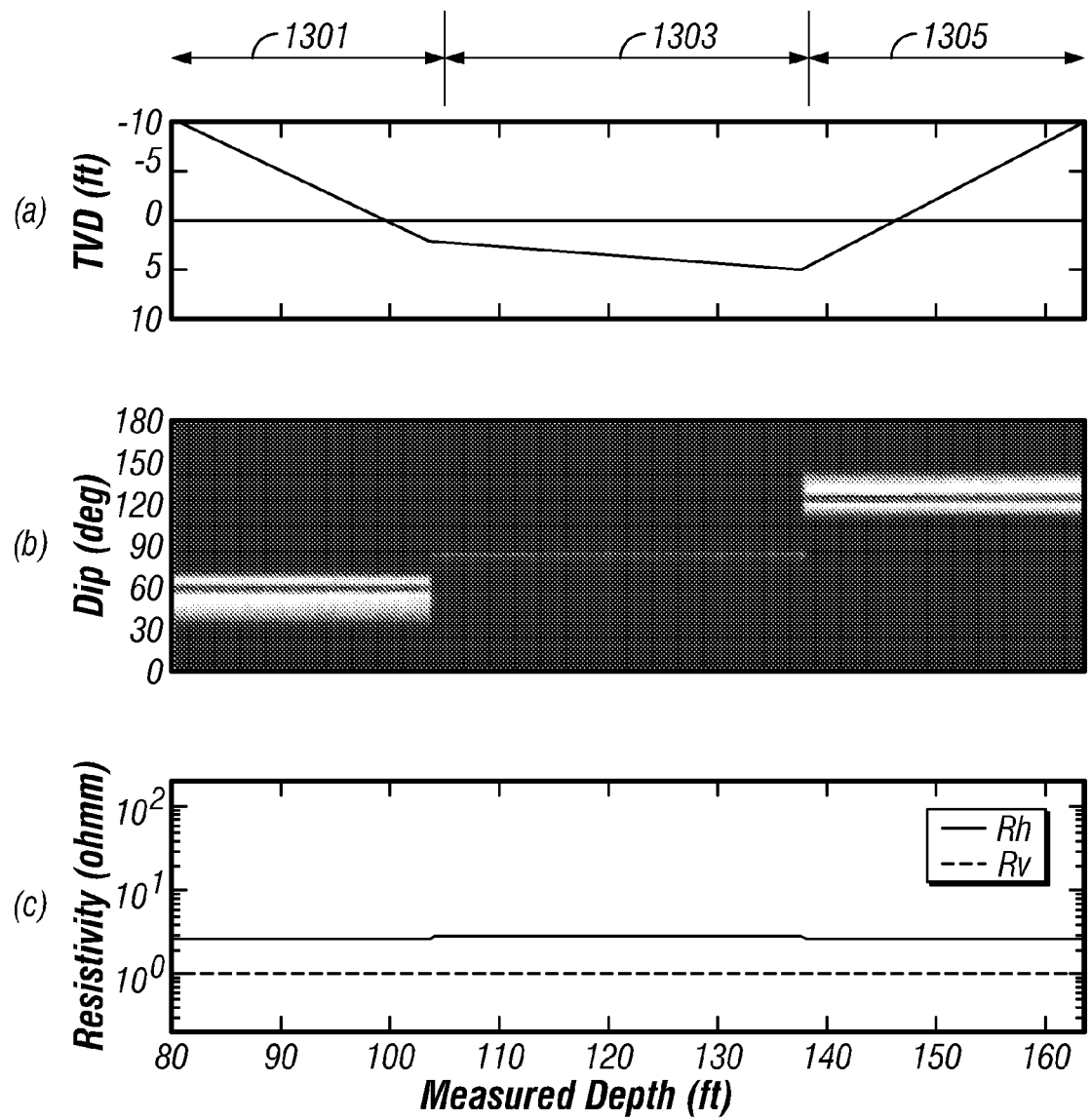
FIG. 13 shows (a) a curved wellpath in a uniform, anisotropic formation with $R_h$=1 Ω-m, $R_v$=3 Ω-m, (b) calculated dip, and (c) calculated $R_h$ and $R_v$.

We now illustrate the structural dip and resistivity anisotropy determination using a synthetic example. FIG. 13 shows the calculation result for a uniform, anisotropic medium with $R_h=1$ Ω-m and $R_v=3$ Ω-m. The apparent dip angles are 60°, 88°, and 120° degrees, in the regions indicated by 1301, 1303, 1305 respectively. All the three parameters, $R_h$, $R_v$, and apparent dip, are accurately calculated. A high apparent dip angle reduces the dip uncertainty. As noted about, the relative azimuth is first determined from the APR measurements. The remaining three parameters ($R_h$, $R_v$, and apparent dip) may be determined either by a three-dimensional search on by a table lookup.

Figure 14:
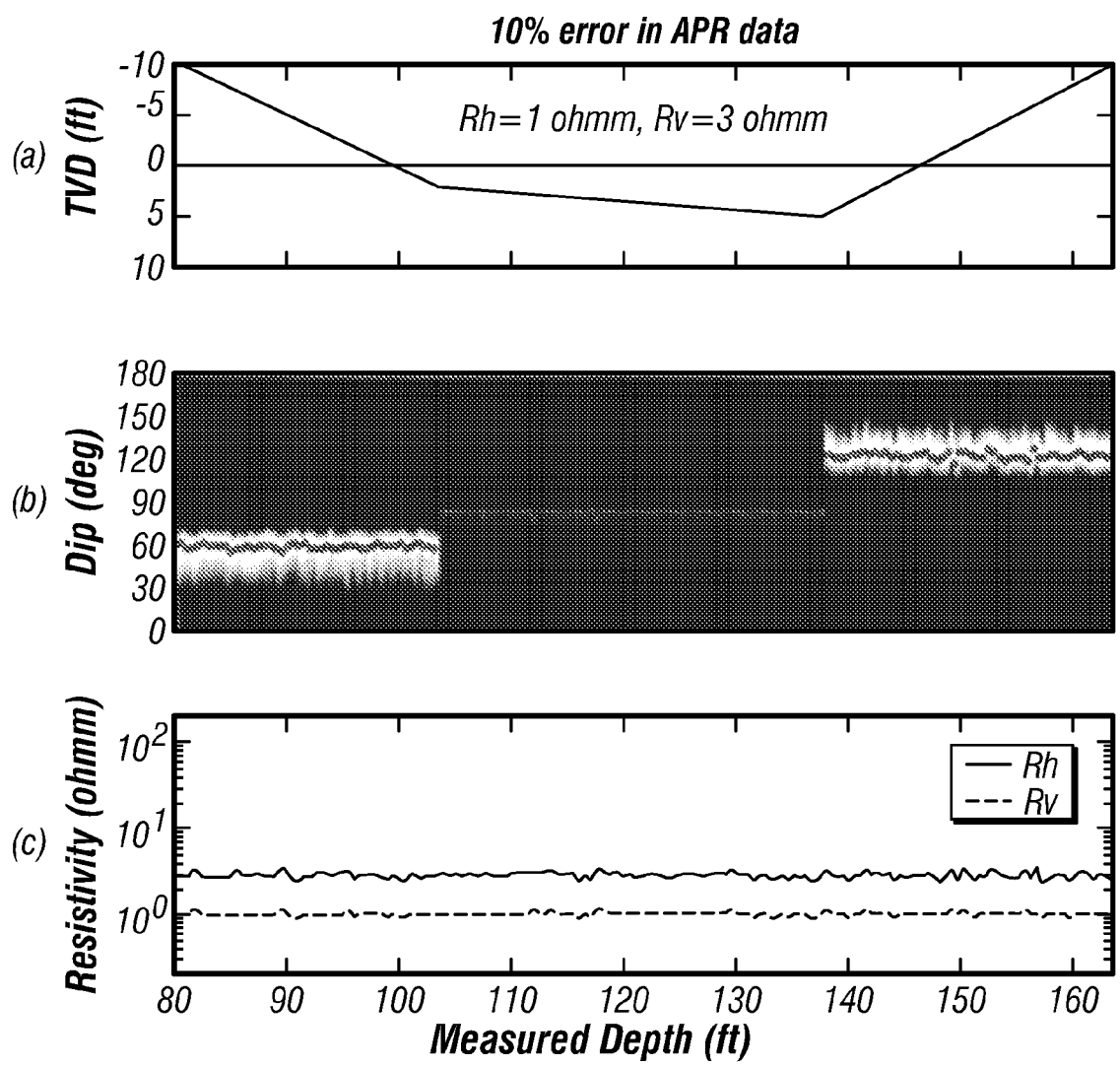
FIG. 14 is similar to FIG. 13 but with 10% noise added to the APR data.

To test the calculation in the presence of data noise, we show in FIG. 14 the calculation results with 10% noises added to the APR data. With 10% noise, the parameter variations increase but the calculation still yields stable results. The apparent dip varies within 10°. These examples indicate that by using redundant data, stable results can be obtained from noisy data.

Figure 15:
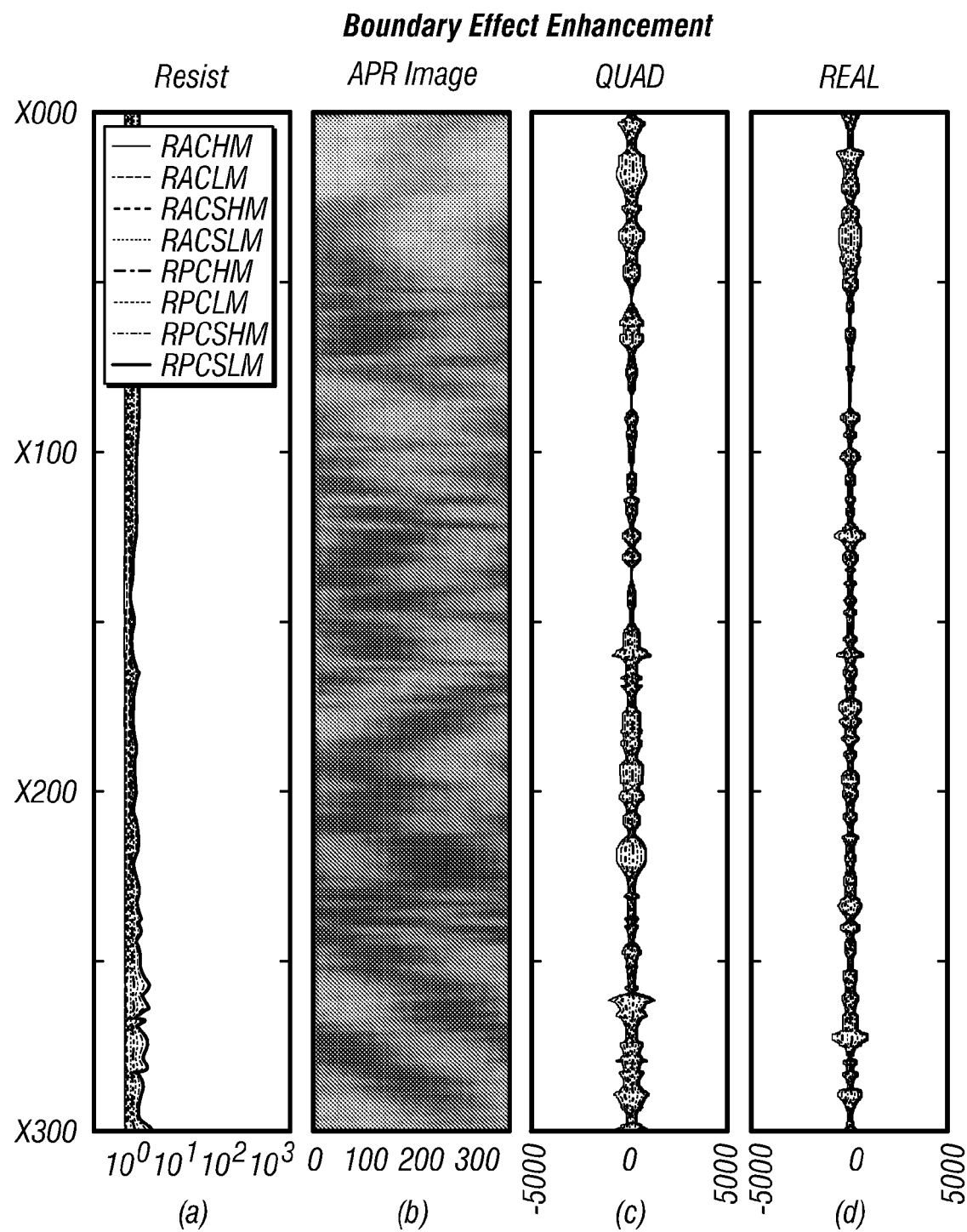
FIG. 15 shows data from a well in the North Sea: (a) MPR responses, (b) APR image, (c) APR quadrature components, and (d) APR in-phase components, wherein the APR data are processed to enhance bed-boundary effects.
Figure 16:
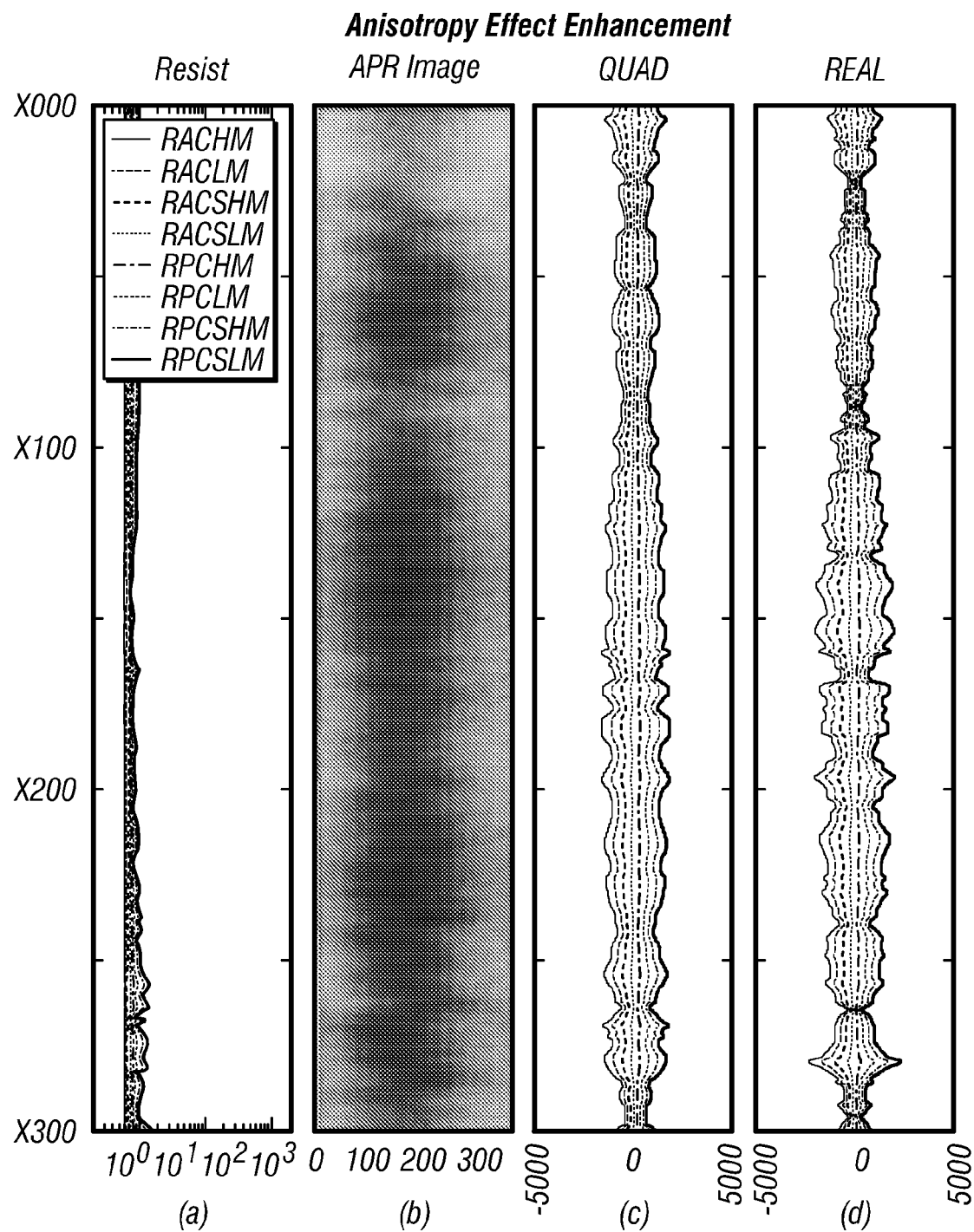
FIG. 16 is similar to FIG. 15 but with the APR data processed to enhance the anisotropy.
Figure 17:
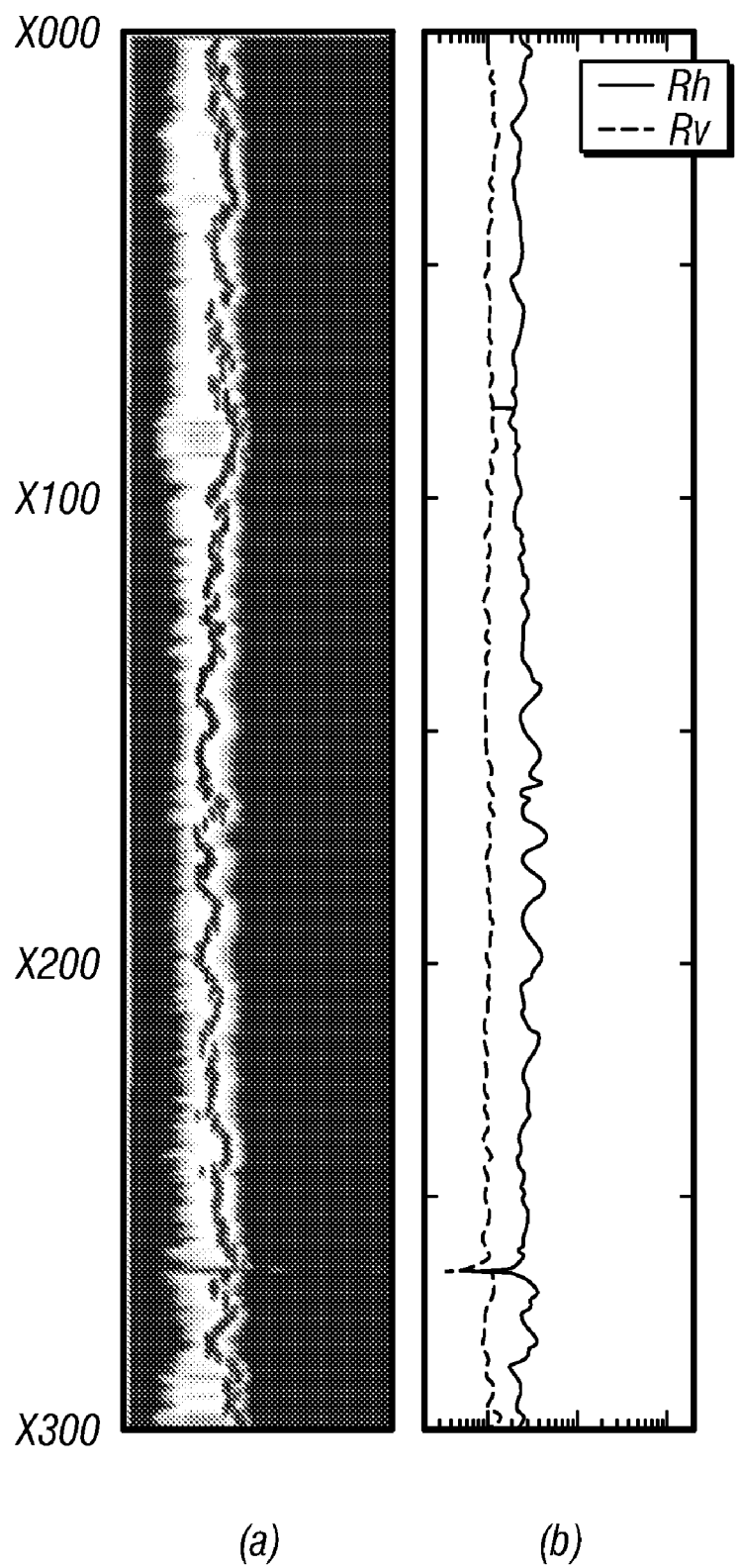
FIG. 17 shows (a) calculated relative dip angle, and (b) $R_h$ and $R_v$ derived from the data of FIG. 15.

FIGS. 15-17 show field data examples from a North Sea well. FIG. 15(a) shows the standard propagation resistivity responses in a shale interval. An 'A' in the second position of the legend for a curve indicates a resistivity measurement derived from amplitude differences and a 'P' in the second position of the legend for a curve indicates a resistivity measurement derived from phase differences. An 'H' in the penultimate position indicates a high-frequency (2 MHz) measurement and an 'L' in the penultimate position indicates a low-frequency (500 kHz) measurement. The presence of an 'S' indicates a measurement made with a short spacing. The APR responses in the interval were processed to minimize the anisotropy effect. The APR resistivity image (b) shows no consistent bed dip. The standard propagation resistivity responses in (a) show the characteristic anisotropy-induced curve separation. FIGS. 15(c) and (d) show the quadrature and the in-phase components by azimuthal sectors.

After processing to enhance the anisotropy effect, the APR responses now show stronger signals. See FIG. 16. The corresponding resistivity image in (b) shows a consistent azimuth direction. The result confirms that the formation is significantly anisotropic. The calculated $R_h$, $R_v$, and apparent dip are shown in FIG. 17. $R_h$ is near 1 Ω-m. $R_v$ varies between 2 Ω-m and 4 Ω-m. The apparent dip falls within approximately 50° to 70°. There appears to be a tenancy tendency that when $R_h$ increases, the apparent dip decreases, and vice versa. This suggests that the combined parameter, β, will have less variation than either $R_h$ or the apparent dip. In this example, the equivalent parameter is achieved through variable $R_v$; the horizontal resistivity $R_h$ is much more stable.

The resistivity parameters and the structural parameters determined in this fashion may be recorded on a suitable medium, stored on a computer memory, or displayed on a screen on a drilling rig for making drilling decisions in real time. The estimated parameters may, in combination with NMR measurements, be also used to provide an estimate of formation permeability (which would also be anisotropic). This is of great value in reservoir evaluation and development. See U.S. Pat. No. 6,686,736 to Schoen et al., having the same assignee as the present disclosure.

It should be noted that the description above is in terms of two instruments, one of which (the APR) gets the azimuthally sensitive measurements and the other (the MPR) makes the azimuthally insensitive measurements. This is not to be construed as a limitation to the method. The method can also be practiced with the 3DEX® of Baker Hughes that has x-, y- and z-oriented transmitters and receivers. The azimuthally sensitive measurements could be obtained using the z-transmitter and either the x- or y-receivers, while an azimuthally insensitive measurement could be obtained with the z-transmitter and the z-receiver.

The disclosure has been described above with reference to a drilling assembly conveyed on a drillstring. However, the method and apparatus of the disclosure may also be used with a drilling assembly conveyed on coiled tubing. The method may also be used on a rotating, wireline conveyed logging tool. For the purposes of this disclosure, the term "downhole assembly" may be used to describer a bottomhole assembly conveyed on a drilling tubular and a string of logging instruments conveyed on a wireline.

It should further be noted that while the disclosure has been described with a dual transmitter, dual receiver configuration, the method of the disclosure is equally applicable with a dual transmitter single receiver arrangement. In such a situation, the raw signals in the single transmitter may be used (instead of the difference signal given by eqn. 1).

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EAROMs, EPROMs, EEPROMs, Flash Memories and Optical disks.

What is claimed is:

1. A method of evaluating an anisotropic earth formation, the method comprising:
   making azimuthally sensitive measurements indicative of a resistivity property of an earth formation using a downhole assembly in a borehole;
   making additional measurements indicative of the resistivity property of the earth formation using a transmitter antenna on the downhole assembly having an axis substantially parallel to a longitudinal axis of the downhole assembly and a receiver antenna on the downhole assembly having an axis substantially parallel to the longitudinal axis of the downhole assembly; and
   using a processor for estimating from the azimuthally sensitive measurements and the additional measurements a value of at least one property from the group: (i) a horizontal resistivity of the earth formation, (ii) a vertical resistivity of the earth formation, (iii) a dip angle of a formation anisotropy axis, and (iv) an azimuth angle of the formation anisotropy axis.

2. The method of claim 1 wherein making the azimuthally sensitive measurements further comprises using a receiver antenna oriented at an angle to the longitudinal axis of the downhole assembly.

3. The method of claim 2 further comprising using for the receiver antenna an antenna that is oriented substantially orthogonal to the longitudinal axis of the downhole assembly.

4. The method of claim 1 wherein estimating the value of the at least one property further comprises:
   (a) using the azimuthally sensitive measurements to estimate the value of the azimuth angle; and
   (b) using the estimated value of the azimuth angle, the azimuthally sensitive measurements, and the additional measurements for estimating the value of the horizontal resistivity, the vertical resistivity and the relative dip.

5. The method of claim 1 wherein estimating the value of the at least one property further comprises using at least one of: (i) a 3-D search, and (ii) a table lookup.

6. The method of claim 1 wherein the additional measurements further comprise measurements made at a plurality of frequencies.

7. The method of claim 1 wherein estimating the value of the at least one property further comprises estimating an apparent resistivity from the additional measurements using at least one of: (i) an amplitude difference between measurements made by two receiver antennas, and (ii) a phase difference between measurements made by two receiver antennas.

8. The method of claim 1 further comprising using a bottomhole assembly as the downhole assembly and conveying the bottomhole assembly into the borehole on a drilling tubular.

9. An apparatus configured to evaluate an anisotropic earth formation, the apparatus comprising:
    a sensor arrangement configured provide azimuthally sensitive measurements indicative of a resistivity property of an earth formation using a downhole assembly in a borehole;
    a transmitter antenna on the downhole assembly having an axis substantially parallel to a longitudinal axis of the downhole assembly;
    a receiver antenna on the downhole assembly having an axis substantially parallel to the longitudinal axis of the downhole assembly, the receiver antenna configured to provide additional measurements indicative of the resistivity property of the earth formation upon activation of the transmitter antenna; and
    a processor configured to use the azimuthally sensitive measurements and the additional measurements to estimate a value of at least one property from the group: (i) a horizontal resistivity of the earth formation, (ii) a vertical resistivity of the earth formation, (iii) a dip angle of a formation anisotropy axis, and (ii) (iv) an azimuth angle of the formation anisotropy axis.

10. The apparatus of claim 9 wherein the sensor arrangement further comprises a receiver antenna oriented at an angle to the longitudinal axis of the downhole assembly.

11. The apparatus of claim 10 wherein the receiver antenna is oriented substantially orthogonal to the longitudinal axis of the downhole assembly.

12. The apparatus of claim 9 wherein the processor is configured to estimate the value of the at least one property by further:
    (a) using the azimuthally sensitive measurements to estimate the value of the azimuth angle; and
    (b) using the estimated value of the azimuth angle, the azimuthally sensitive measurements, and the additional measurements for estimating the value of the horizontal resistivity, the vertical resistivity and the relative dip.

13. The apparatus of claim 9 wherein the processor is configured to estimate the value of the at least one property by further using at least one of: (i) a 3-D search, and (ii) a table lookup.

14. The apparatus of claim 9 wherein the receiver antenna is further configured to provide the additional measurements upon activation of the transmitter antenna at a plurality of frequencies.

15. The apparatus of claim 9 wherein the processor is configured to estimate the value of the at least one property by further estimating an apparent resistivity from the additional measurements using at least one of: (i) an amplitude difference between measurements made by two receiver antennas, and (ii) a phase difference between measurements made by two receiver antennas.

16. The apparatus of claim 9 wherein the downhole assembly further comprises a bottomhole assembly conveyed into the borehole on a drilling tubular.

17. A non-transitory computer-readable medium product having thereon instructions that when read by a processor cause the processor to execute a method, the method comprising:
    processing azimuthally sensitive measurements indicative of a resistivity property of an earth using a rotating downhole assembly in a borehole; and
    additional, azimuthally insensitive measurements indicative of the resistivity property of the earth formation;
    for estimating a value of at least one property of the earth formation from the group: (i) a horizontal resistivity of the earth formation, (ii) a vertical resistivity of the earth formation, (iii) a dip angle of a formation anisotropy axis, and (iv) an azimuth angle of the formation anisotropy axis.

18. The non-transitory computer-readable medium product of claim 17 further comprising at least one of: (i) a ROM, (ii) an EAROM, (iii) an EPROM, (iv) an EEPROM, (v) a flash memory, or (vi) an optical disk.

* * * * *